United States Patent
Shotey et al.

(10) Patent No.: US 7,977,572 B1
(45) Date of Patent: Jul. 12, 2011

(54) ELECTRICAL DEVICE COVER

(75) Inventors: Marcus J. Shotey, Scottsdale, AZ (US);
Richard L. Cleghorn, Tempe, AZ (US);
Jeffrey P. Baldwin, Phoenix, AZ (US)

(73) Assignee: TayMac Corporation, Gilbert, AZ (US)

( * ) Notice: Subject to any disclaimer, the term of this patent is extended or adjusted under 35 U.S.C. 154(b) by 356 days.

(21) Appl. No.: 12/263,189

(22) Filed: Oct. 31, 2008

Related U.S. Application Data

(63) Continuation-in-part of application No. 11/753,148, filed on May 24, 2007, now Pat. No. 7,449,634.

(60) Provisional application No. 60/803,106, filed on May 24, 2006.

(51) Int. Cl.
*H02G 3/14* (2006.01)

(52) U.S. Cl. .............. 174/66; 174/67; 174/53; 220/241; 220/242

(58) Field of Classification Search ................. 174/480, 174/481, 50, 53, 57, 58, 66, 67; 220/3.2–3.9, 220/4.02, 241, 242; 439/535, 536; D13/156
See application file for complete search history.

(56) References Cited

U.S. PATENT DOCUMENTS

| | | |
|---|---|---|
| 872,964 A | 12/1907 | Thiem |
| 932,601 A | 8/1909 | Corbett |
| 1,608,621 A | 11/1926 | Sachs |
| 1,784,277 A | 12/1930 | Darlington |
| 1,952,719 A | 3/1934 | Lewin |
| 2,240,187 A | 4/1941 | Kingdon et al |
| 252,606 A | 10/1950 | Hendrick |
| 2,559,151 A * | 7/1951 | Getzoff ........................ 174/67 |
| 2,916,733 A | 12/1959 | Hirsch |
| 3,252,611 A | 5/1966 | Weitzman et al. |
| 3,432,611 A | 3/1969 | Gaines et al. |
| 3,437,738 A | 4/1969 | Wagner |
| 3,438,534 A | 4/1969 | Zerwes |
| 3,491,327 A | 1/1970 | Tait et al. |
| 3,518,356 A | 6/1970 | Friedman |
| 3,530,230 A | 9/1970 | Cormier |
| 3,544,703 A | 12/1970 | Jones |
| 3,564,112 A | 2/1971 | Algotsson et al. |
| 3,598,897 A * | 8/1971 | Castic ........................ 174/481 |
| 3,654,663 A | 4/1972 | Algotsson |
| 3,690,035 A | 9/1972 | Schindluaer |
| 3,895,179 A | 7/1975 | Wyatt |
| 3,956,573 A * | 5/1976 | Myers et al. ................. 174/67 |
| 3,965,287 A | 6/1976 | Mueller |
| 4,032,030 A | 6/1977 | Bass |
| 4,197,959 A | 4/1980 | Kramer |
| 4,302,624 A * | 11/1981 | Newman ....................... 174/67 |
| 4,342,493 A | 8/1982 | Grenell |
| 4,424,407 A | 1/1984 | Barbic |

(Continued)

FOREIGN PATENT DOCUMENTS

GB 326377 3/1930

*Primary Examiner* — Angel R Estrada
(74) *Attorney, Agent, or Firm* — Booth Udall, PLC

(57) ABSTRACT

An electrical device cover with a rotatable lid. An implementation of a weatherproof electrical device cover may include a base unit having a face, an electrical device aperture, and a box mounting screw aperture therethrough. A lid may be rotatably coupled to the base unit and rotate over the base unit in a plane substantially parallel with the base unit. The lid may cover the electrical device aperture of the base unit when the lid is closed over the base unit.

22 Claims, 8 Drawing Sheets

U.S. PATENT DOCUMENTS

| | | |
|---|---|---|
| 4,500,746 A | 2/1985 | Meehan |
| 4,705,335 A | 11/1987 | Goebel |
| 4,737,599 A | 4/1988 | Fontaine |
| 4,757,908 A | 7/1988 | Medlin, Sr. |
| 4,833,277 A | 5/1989 | Jacoby |
| 4,844,275 A | 7/1989 | Schnell et al. |
| 4,979,634 A | 12/1990 | Begley |
| 4,998,635 A | 3/1991 | Vink et al. |
| 5,072,848 A | 12/1991 | Pipis et al. |
| 5,076,641 A | 12/1991 | Lindberg |
| 5,178,350 A | 1/1993 | Vink et al. |
| 5,218,169 A | 6/1993 | Riceman |
| 5,280,135 A | 1/1994 | Berlin et al. |
| 5,362,924 A | 11/1994 | Correnti |
| 5,527,993 A | 6/1996 | Shotey et al. |
| 5,556,289 A | 9/1996 | Holbrook |
| 5,763,831 A | 6/1998 | Shotey et al. |
| 6,160,219 A | 12/2000 | Maltby et al. |
| D460,421 S * | 7/2002 | Marozsan, Jr. ............... D13/156 |
| 6,476,321 B1 | 11/2002 | Shotey et al. |
| 7,129,413 B1 * | 10/2006 | Rao et al. ........................ 174/67 |
| 7,598,452 B1 * | 10/2009 | Shotey et al. ................... 174/66 |

\* cited by examiner

ELECTRICAL DEVICE COVER

CROSS REFERENCE TO RELATED APPLICATIONS

This document is a continuation-in-part application of co-owned U.S. patent application to Shotey et al., entitled "Electrical Device Cover," Ser. No. 11/753,148, filed May 24, 2007, now pending, which claims priority to the following provisional application, the disclosure of which is hereby incorporated entirely herein by reference: U.S. Provisional Patent Application 60/803,106, entitled "Corner Pivot Electrical Device Cover" to Shotey, et al. which was filed on May 24, 2006. The disclosure of U.S. Pat. No. 7,368,662 to Shotey et al. entitled "Horizontal and Vertical In-Use Electrical Device Cover," issued May 6, 2008, is hereby incorporated entirely herein by reference.

BACKGROUND

1. Technical Field

Aspects of this document relate generally to covers for electrical devices.

2. Background Art

Electrical devices often include protection from water and other contaminants. To provide the needed protection, covers have been conventionally used, particularly when electrical devices are mounted in outdoor locations. A wide variety of cover designs have been devised, the most common being a cover that includes a base hingedly attached to a lid that closes over the face of an electrical device under gravity force, such as that disclosed in U.S. Pat. No. 5,763,831 to Shotey (issued Jun. 9, 1998), the relevant disclosure of which is hereby incorporated herein by reference.

SUMMARY

First implementations of a weatherproof electrical device cover or electrical device cover may include a base unit having a face, an electrical device aperture, a box mounting screw aperture therethrough, a perimeter, and a flange extending outwardly along at least a portion of the perimeter. A lid may be rotatably coupled to the base unit. The lid may rotate over the base unit in a plane substantially parallel with the base unit. The lid may cover the electrical device aperture of the base unit when the lid is closed over the base unit. The flange may be located within the lid when the lid is closed over the base unit.

First implementations of a weatherproof electrical device cover or electrical device cover may include one, all, or any of the following:

The lid may further include a pin and the lid may be coupled to the base unit at a pin opening in the base unit.

The pin may be coupled within the pin opening to the base unit through a spring.

The perimeter of the base unit may be located at one of the electrical device aperture and an edge of the face of the base unit.

The base unit and the lid may be rotatably coupled at a corner of the base unit.

Second implementations of a weatherproof electrical device cover or electrical device cover may include a base unit having an electrical device aperture and a box mounting screw aperture therethrough. A lid formed as a single unitary piece may be included. The base unit and lid may be coupled at a corner of the base unit through a pin at a pin opening. The lid may rotate over the base unit in a plane substantially parallel with the base unit.

Second implementations of a weatherproof electrical device cover or electrical device cover may include one, all, or any of the following:

The pin may be coupled within the pin opening to the base unit through a spring.

The lid may include the pin and the base unit may include the pin opening. Alternatively, the base unit may include the pin and the lid may include the pin opening.

Third implementations of a weatherproof electrical device cover or electrical device cover may include a base unit having an electrical device aperture and a box mounting screw aperture therethrough. A lid may be included. The base unit and the lid may be rotatably coupled through spring. The lid may rotate over the base unit in a plane substantially parallel with the base unit.

Third implementations of a weatherproof electrical device cover or electrical device cover may include one, all, or any of the following:

The base unit and the lid may be rotatably coupled at a corner of the base unit.

First, second, and third implementations of a weatherproof electrical device cover or electrical device cover may include one, all, or any of the following:

The lid of the base unit may be configured to close over the base unit under gravity force when the cover is mounted to a wall in either a vertical or a horizontal orientation.

The base unit may be configured to accommodate a first electrical device type and the base unit may further include at least one removable tab, wherein removal of the at least one removable tab converts the electrical device aperture in the base unit to accommodate at least a second electrical device type different from the first electrical device type.

The base unit may be configured to accommodate a first electrical device type and the base unit may further include at least one adapter plate, wherein the adapter plate converts the electrical device aperture in the base unit to accommodate at least a second electrical device type different from the first electrical device type.

The adapter plate may further include at least one removable tab, wherein removal of the at least one removable tab converts the electrical device aperture in the base unit configured to accommodate a first electrical device type to accommodate at least a second electrical device type different from the first electrical device type.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical device covers and implementing components, consistent with the intended operation.

Structure.

Figure 1:
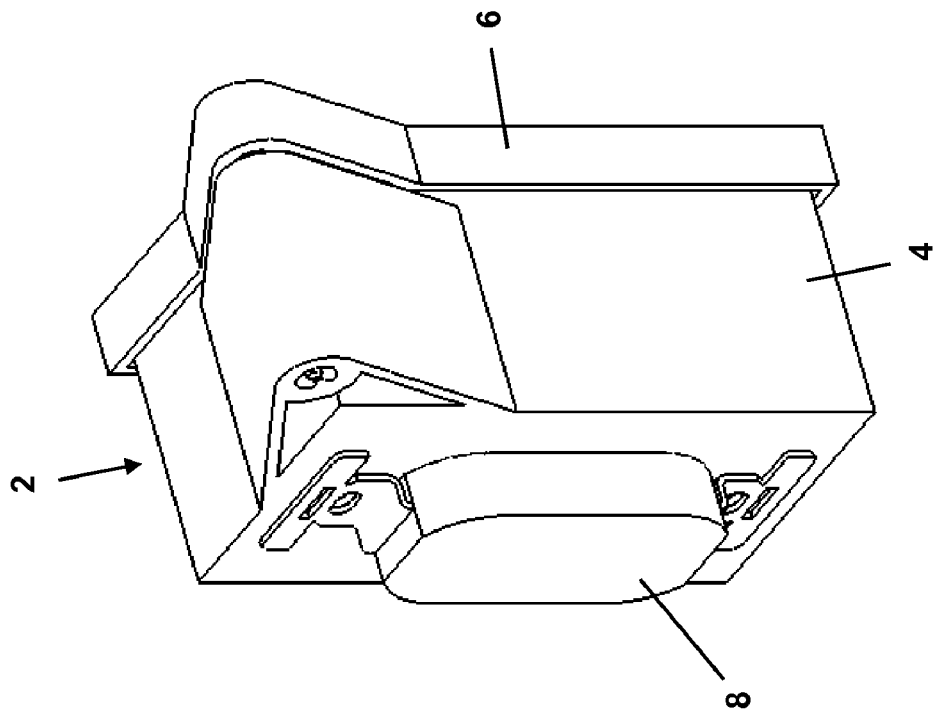
FIG. 1 is a front perspective view of a particular implementation of an electrical device cover with the lid closed over the base unit showing the sectional line A.
Figure 2:
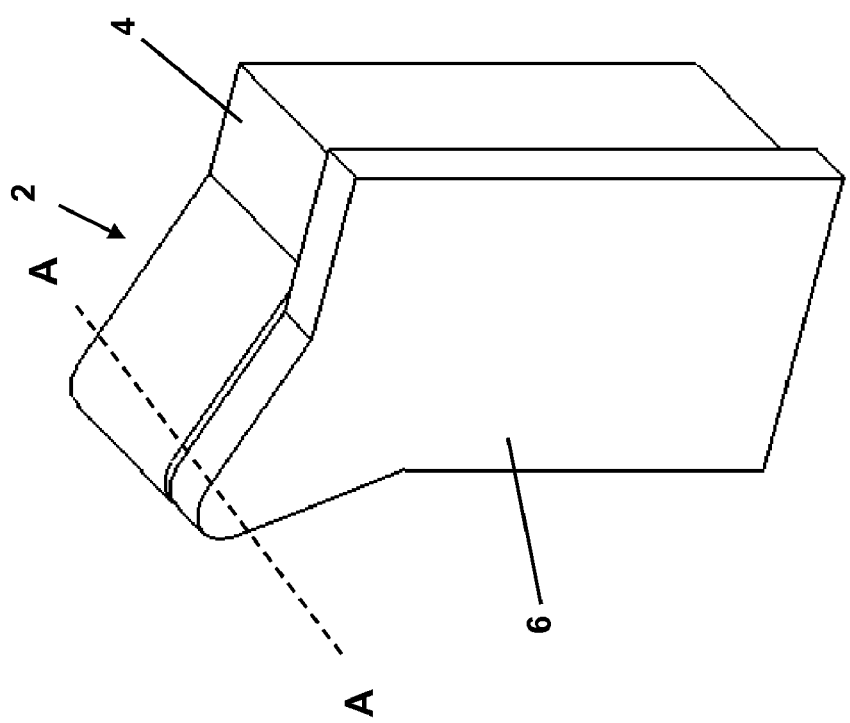
FIG. 2 is a rear perspective view of the electrical device cover of FIG. 1 with an electrical device coupled to the cover.

Referring to FIG. 1, a particular implementation of an electrical device cover 2 is illustrated. The electrical device cover 2 may include a base unit 4 coupled to a lid 6. While the base unit 4 illustrated is shown as a single piece, in other implementations the base unit 4 may be formed of any number of pieces coupled together. FIG. 2 illustrates a rear view of the particular implementation of the electrical device cover 2 showing an electrical device 8 coupled to the base unit 4. The electrical device cover 2 may be coupled over the electrical device 8 when the electrical device 8 has been installed in a wall or other location. Particular implementations of an electrical device cover 2 may be weatherproof and, therefore, resist entry of water and other contaminants through use of the lid 6 and other structures.

Figure 3:
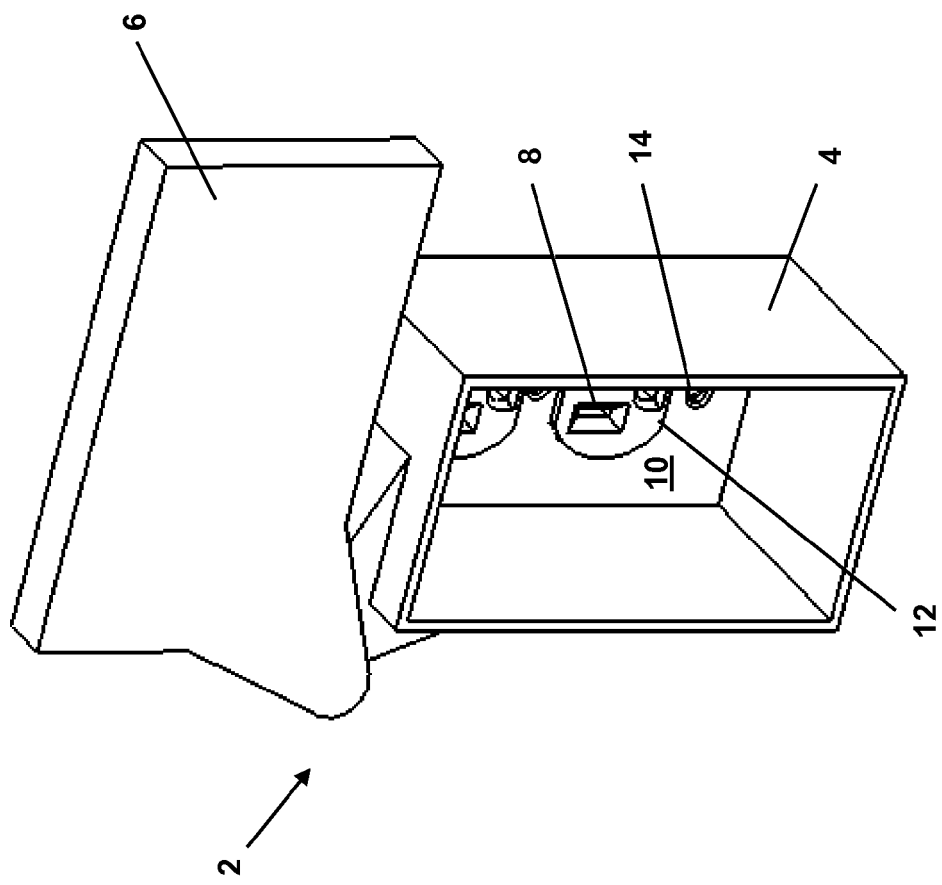
FIG. 3 is a front perspective view of the electrical device cover of FIG. 1 in an open position, exposing the electrical device aperture of the base unit.

Referring to FIG. 3, an implementation of an electrical device cover 2 is illustrated with the lid 6 rotated away from the base unit 4. The face of the electrical device 8 can be seen within the base unit 4, as well as the face 10 of the base unit 4 itself. The face of the electrical device 8 may extend through an electrical device aperture 12 configured to accommodate the electrical device 8 in the face 10 of the base unit 4. The base unit 4 may also include removable tabs that allow the electrical device aperture 12 to be converted to accommodate a second electrical device type. In addition, the base unit 4 may include an adapter plate that may allow the electrical device aperture 12 to be converted to accommodate a second electrical device type. In particular implementations of an electrical device cover 2, the adapter plate may also include a removable tab to allow the electrical device aperture 12 to be converted to accommodate a second electrical device type.

Relevant teachings regarding removable tabs and adapter plates may be found in U.S. Pat. No. 6,960,721 to Shotey et al. entitled "Convertible Electrical Device Cover Having Removable Tabs With Offset Grooves," the disclosure of which is hereby incorporated herein by reference.

Figure 4:
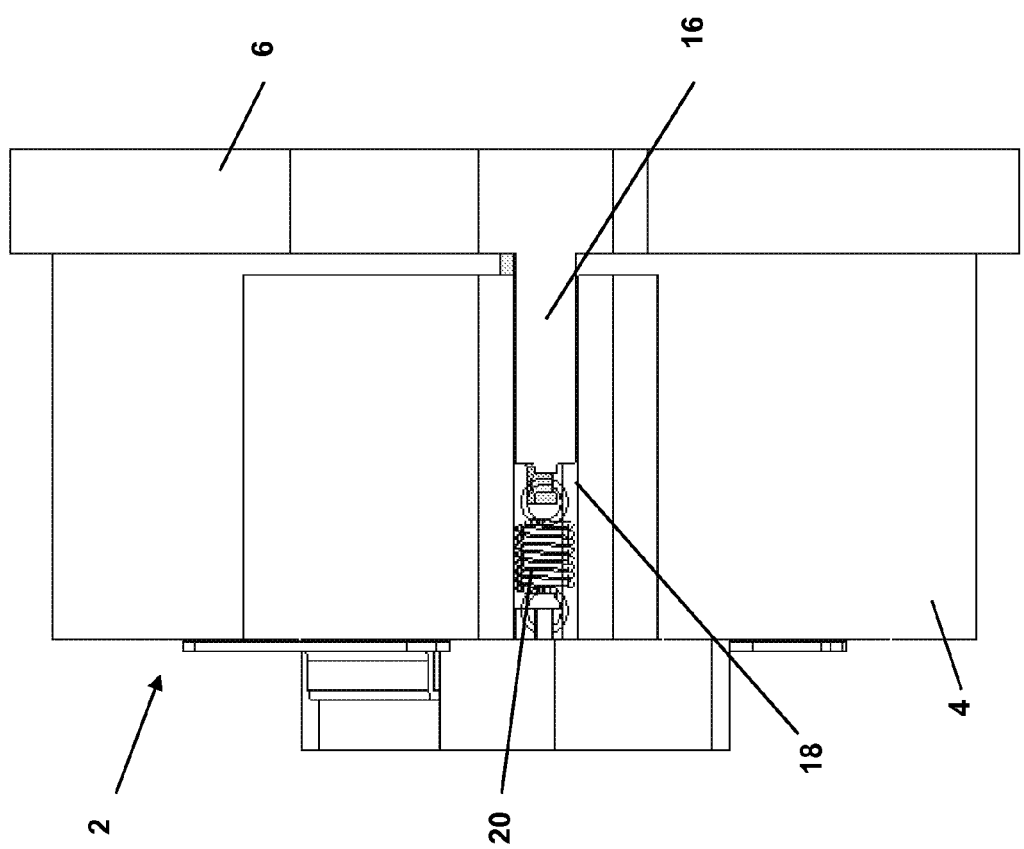
FIG. 4 is a cross sectional view of the electrical device cover of FIG. 1 taken along sectional line A.

Referring to FIG. 4, a cross section view of the area along the sectional line A shown in FIG. 1 is illustrated. This cross section is taken across the point at which the lid 6 and base unit 4 are coupled. In the particular implementation of an electrical device cover 2 illustrated, the lid 6 may include a pin 16 inserted into a pin opening 18 of the base unit 4. The pin 16 may be coupled to the base unit 4 through a spring 20, which may provide a bias force that serves to slidably retract the lid 6 over the base unit 4. The pin 16 may also be sized to allow the lid 6 to slidably move away from the base unit 4 under the influence of an external force. While the particular pin 16 illustrated in FIG. 4 consists of a single prong, in other particular implementations, the pin 16 may include two or more prongs.

Figure 5:
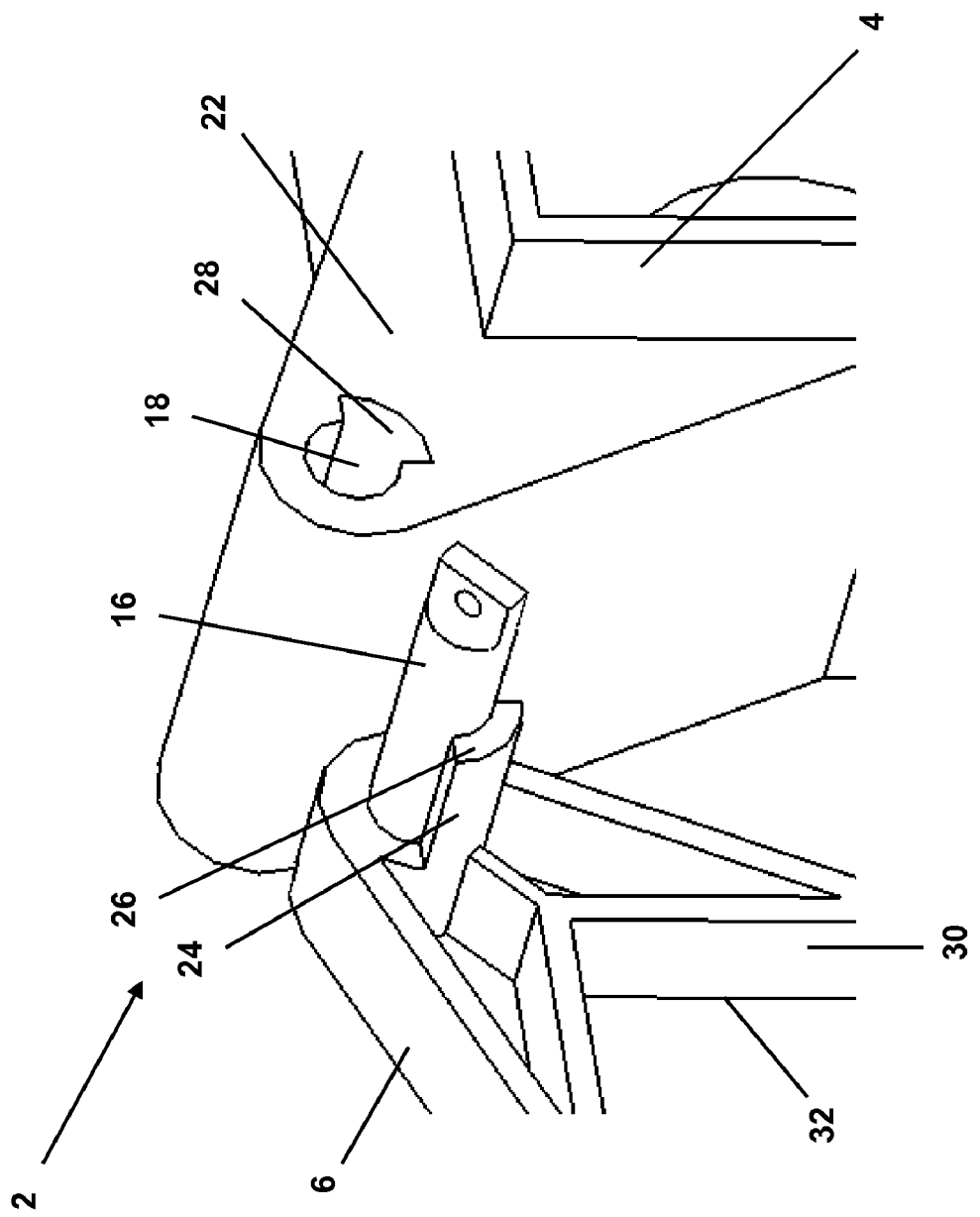
FIG. 5 is a detail view of a particular implementation of an electrical device cover with the pin of the lid removed from the pin opening of the base unit and shown adjacent to the base unit.

FIG. 5 illustrates a detail view of a particular implementation of an electrical device cover 2 with the pin 16 of the lid 6 removed from the pin opening 18 in the base unit 4. As illustrated, the pin opening 18 may include a pin support 22 that extends from the base unit 4. In particular implementations, the pin opening 18 may be located on a side, a corner, or within the base unit 4. In the implementation illustrated in FIG. 5, the pin 16 may include a key 24 with a key face 26. The key 24 may be sized to fit into a keyway notch 28 in the pin opening 18. The height of the key face 26 along the pin 16 may be such that the lid 6 is permitted to rotate freely in a plane substantially parallel to the base unit 4 until the key 24 engages with the keyway notch 28. When the key 24 engages with the keyway notch 28, the pin 16 may move slidably into the pin opening 18 under the influence of the bias from the spring inside the pin opening 18. In particular implementations of the pin opening 18 and key face 26, one or both of an edge of the pin opening 18 extending to the keyway notch 28 and the surface of the key face 26 may be sloped so that the key face 26 has a tendency to slide along the edge of the keyway notch 28 as the lid 6 rotates toward a closed position over the base unit 4. In implementations where a spring is used, such as the spring 20 shown in FIG. 4, the tension of the spring and the angle of the opening of the keyway notch 28 and/or key face 26 (complimentary angles if both are angled), may serve to bias the lid to its closed position. Even where angle(s) is/are used, the lid 6 is still considered to rotate in a plane substantially parallel to the base.

The key face 26 may allow particular implementations of an electrical device cover 2 to be weatherproofed through a flange 30 that extends along at least a portion of the perimeter 32 of the lid 6. The key face 26 may also allow the lid 6 to be extended away from the base unit 4 a sufficient distance to allow lid to rotate in a plane substantially parallel to the base unit 4 without encountering interference from the flange 30. In other particular implementations of a lid 6, no flange 30 may be present and no key face 26 may be utilized. Also, implementations of a lid 6 may be coupled at any location and to any piece forming the base unit 4.

Figure 7B:
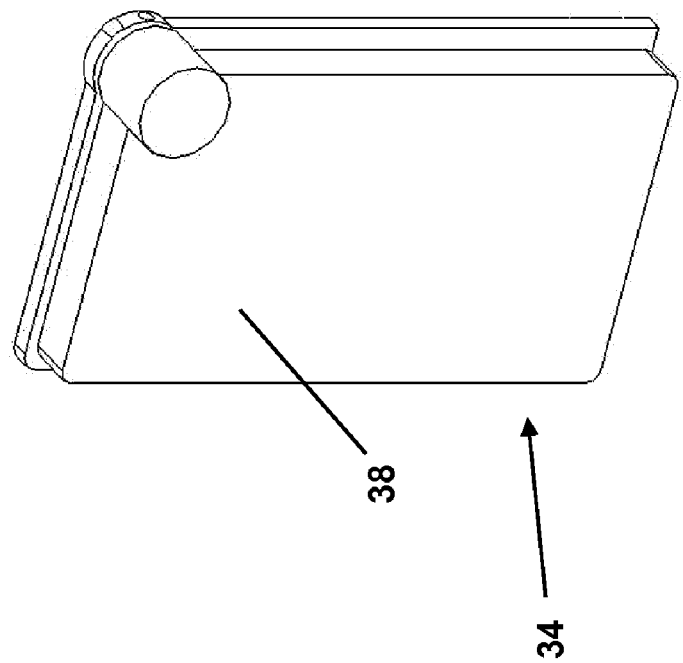
FIG. 7B is a front perspective view of the cover of FIG. 7A in a closed position.
Figure 7A:
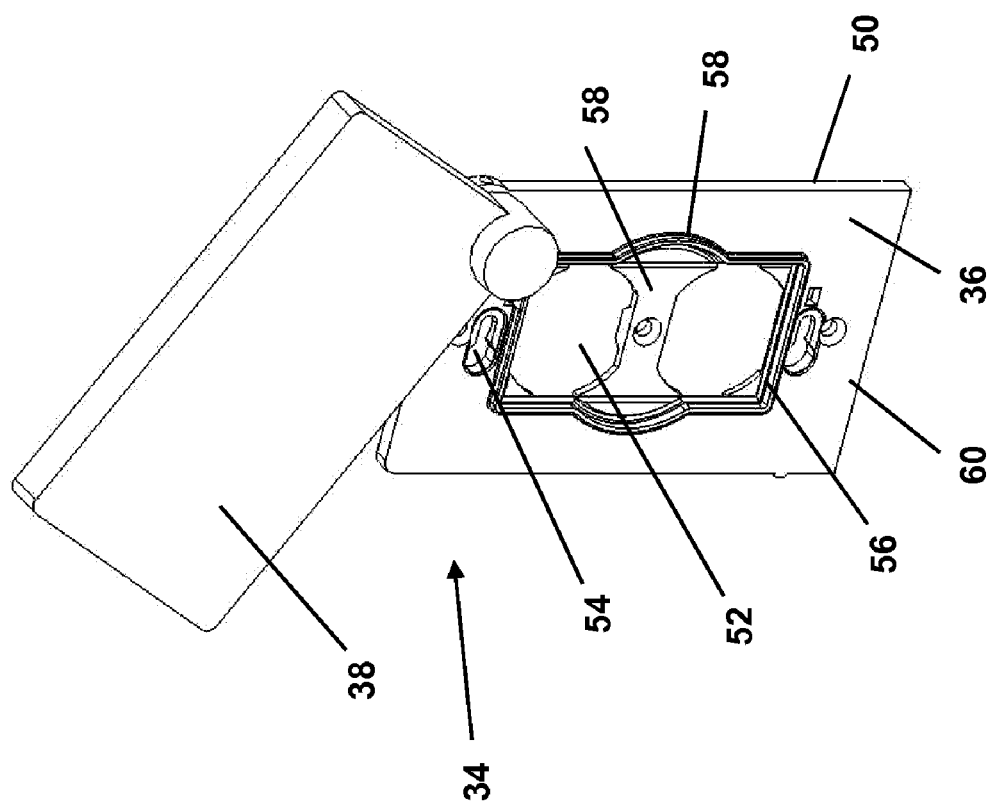
FIG. 7A is a front perspective view of a second implementation of an electrical device cover in an open position.
Figure 8:
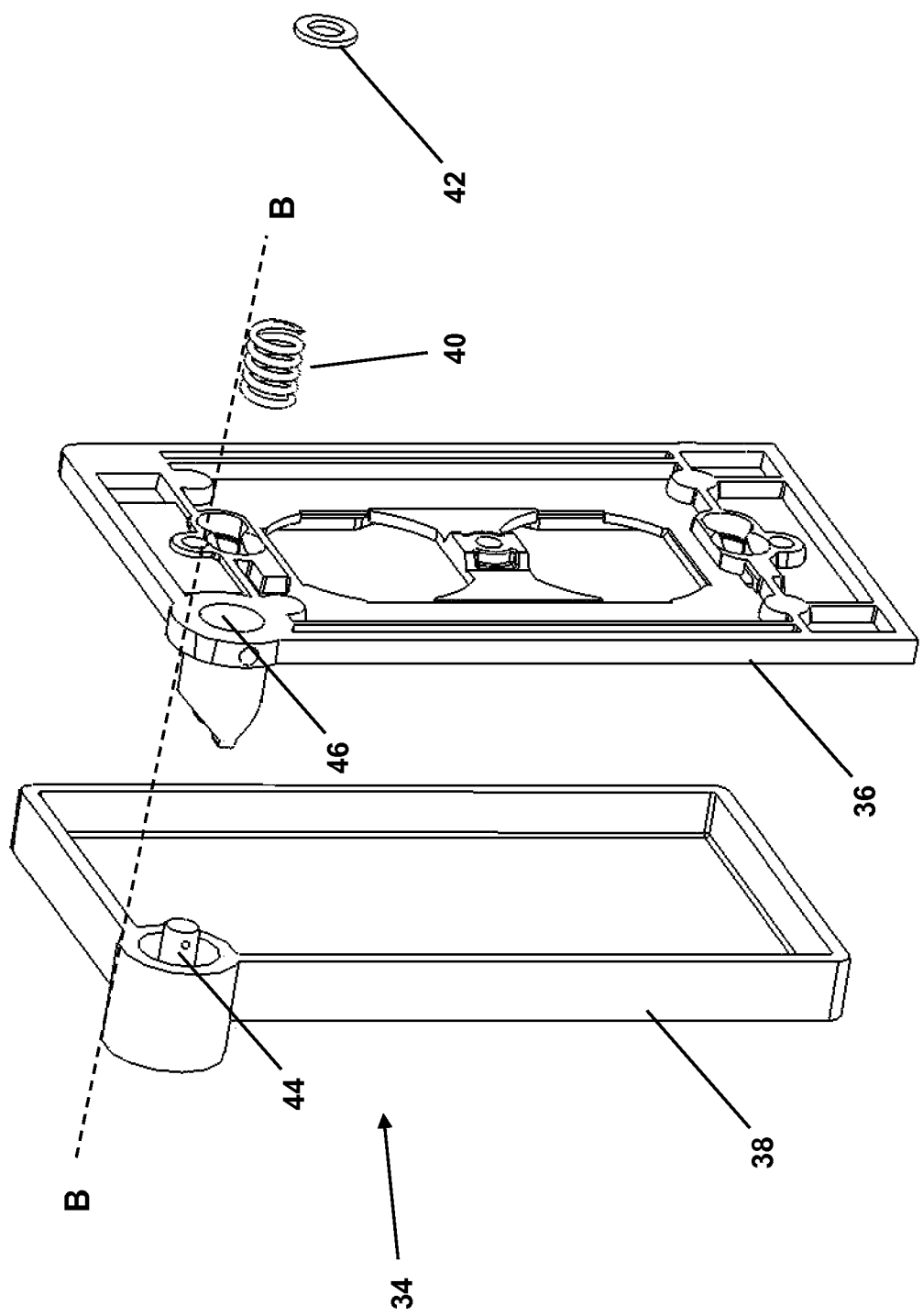
FIG. 8 is an exploded rear perspective view of a second implementation of an electrical device cover showing the sectional line B.

Referring to FIGS. 7A and 7B, another particular implementation of an electrical device cover or weatherproof electrical device cover 34 is illustrated. The electrical device cover 34 illustrated in FIG. 7A is in an open position, while the electrical device cover 34 illustrated in FIG. 7B is in a closed position. Referring to FIG. 8, an implementation of an electrical device cover 34 is illustrated in a rear perspective exploded view. As illustrated, the electrical device cover 34 may include a base unit 36, a lid 38, a spring 40, and a retaining washer 42. As illustrated, the lid 38 may include a pin 44 that couples into a pin opening 46 included in the base unit 36. While in the implementation of an electrical device cover 34 illustrated in FIG. 8 the pin 44 is included on the lid 38 and the pin opening 46 is included in the base unit 36, in other implementations, the pin 44 may be included on the base unit 36 and the pin opening 46 may be included on the lid 38. Particular implementations of electrical device covers 34 may not employ pins or pin openings at all. As illustrated, the lid 38 may also be rotatably coupled to the base unit 36 through the pin 44 and the pin opening 46 at a corner of the base unit. In addition, as illustrated, the lid 38 and the base unit 36 may be rotatably coupled together through the spring 40 at a corner of the base unit 36. In particular implementations of electrical device covers 34, the lid 38 may be formed as a single unitary piece. In such implementations of lids, the formed unitary lid may use various gaskets and sealing rings or structures coupled to the lid.

Figure 9:
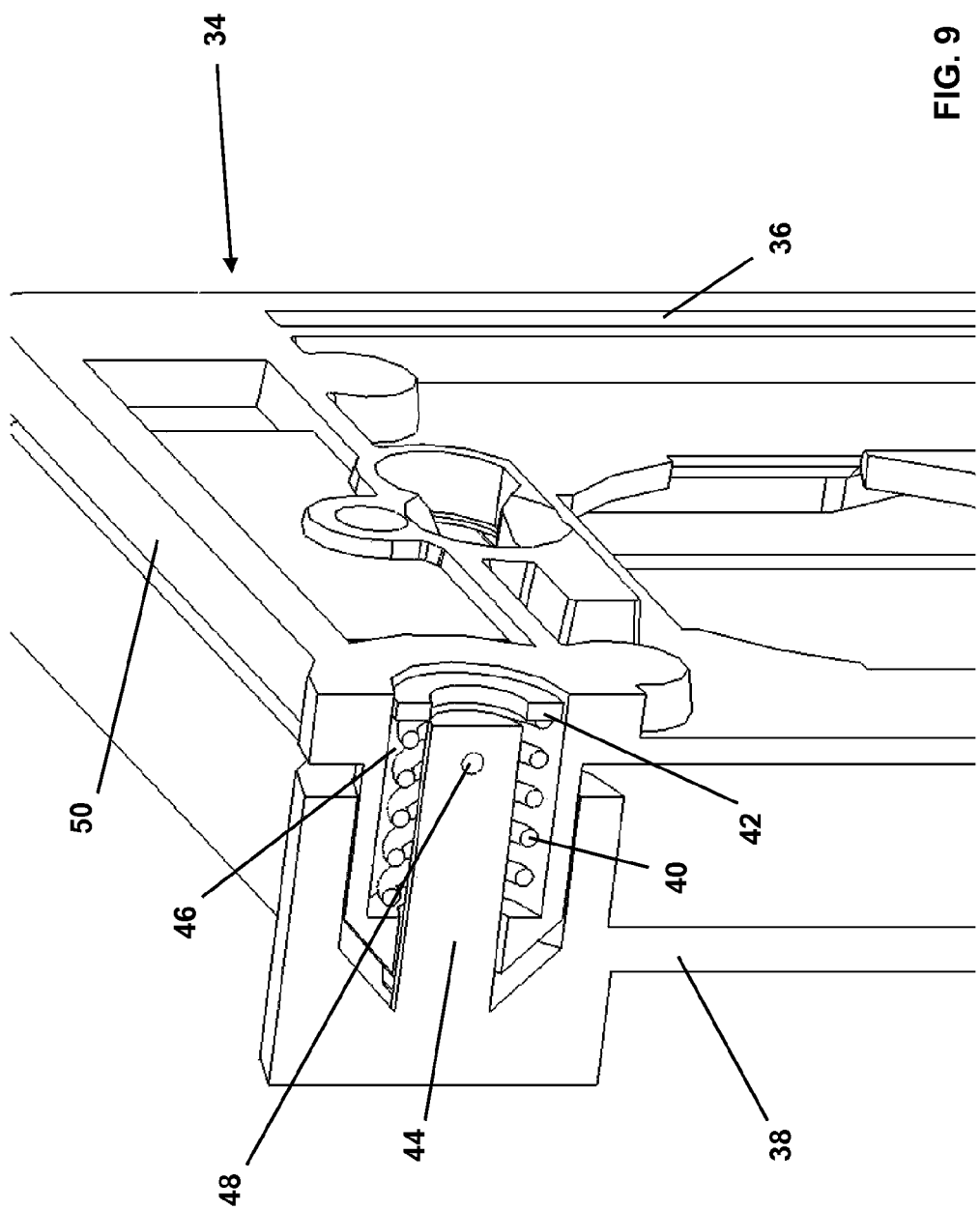
FIG. 9 is a cross sectional view of the electrical device cover of FIG. 8 taken along sectional line B.

Referring to FIG. 9, a cross sectional view of the implementation of the electrical device cover 34 of FIG. 8 is illustrated, taken along sectional line B through the center of the pin 44 and the pin opening 46. As illustrated, the spring 40 biases the pin 44 against the base unit 36 through the retaining washer 42. In particular implementations, the pin coupling opening 48 may be used to assist with coupling the pin 44 within the pin opening 46 through the spring 40. In particular implementations of electrical device covers 34, the lid 38 may cover up to an edge 50 of the base unit 36, but not extend beyond or cover the edge 50. These implementations may be used particularly when the base unit 36 and/or the lid 38 are manufactured from a metal material. Also, in particular implementations, a keyway notch feature similar in structure to those disclosed in this document may be present on the lid 38 or base unit 36, albeit on a shorter scale.

Referring again to FIG. 7A, in particular implementations of electrical device covers 34, the base unit 36 may include an electrical device aperture 52 and a box mounting screw aperture 54. In addition, in particular implementations, the base unit 36 may include a perimeter, which may be the perimeter 56 of the electrical device aperture 52. In these implementations, a flange 58 may extend outwardly along at least a portion of the perimeter 56. In other implementations, the base unit 36 may include a perimeter 60 which may extend along the edge 50 of the base unit 36 and a flange may extend outwardly along at least a portion of the perimeter 60. This flange may be structured similarly to those disclosed previously in this document for while-in-use electrical device cover designs. In the various implementations of electrical device covers 34, the lid 38 may be configured to cover a flange located at either position on the base unit 36, or both positions, when the lid 38 is closed over the base unit 36.

Referring to FIG. 7A, implementations of electrical device covers 34 may also include base units 36 having at least one removable tab 62 where the removal of the at least one removable tab 62 allows the electrical device aperture 52 configured for a first electrical device type (here a duplex receptacle) to be converted to accommodate at least a second electrical device type (here a GFCI or Decora-style receptacle). Various adapter plates with or without removable tabs may be employed in implementations like those previously disclosed in this document.

Use.

Figure 6C:
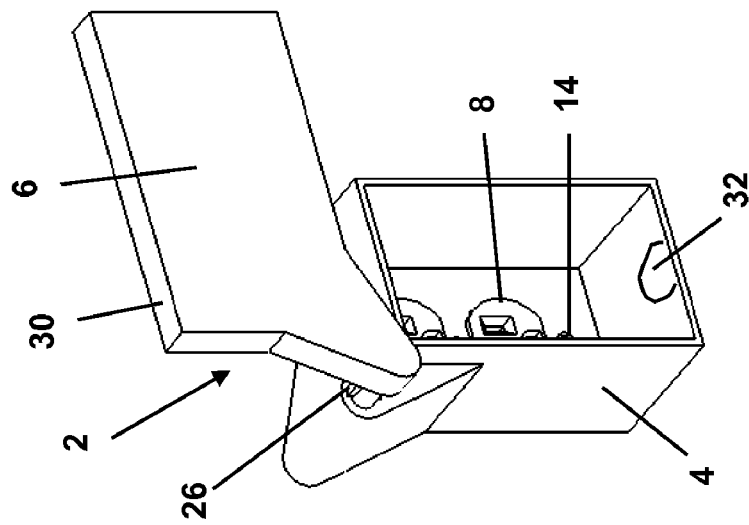
FIG. 6C is a front perspective view of the cover of FIG. 6A in an open position.
Figure 6B:
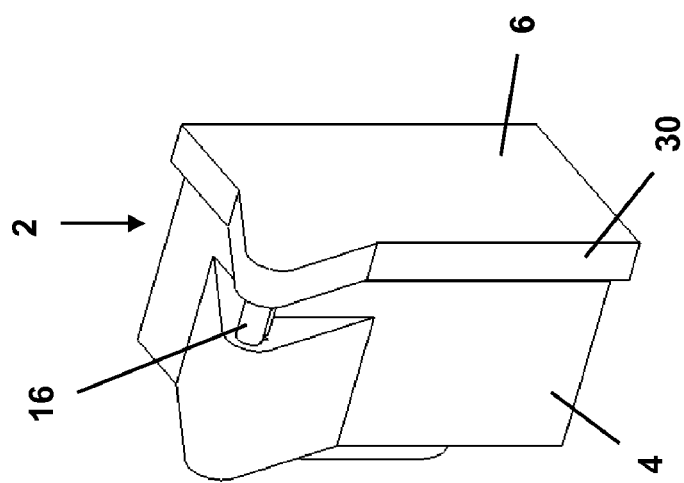
FIG. 6B is a front perspective view of the cover of FIG. 6A in an extended position.
Figure 6A:
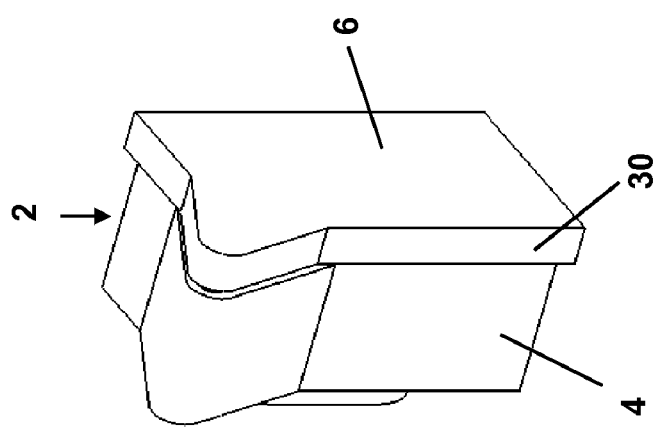
FIG. 6A is a front perspective view of a particular implementation of an electrical device cover in a closed position.

Referring to FIG. 6A, a particular implementation of an electrical device cover 2 is illustrated in a closed position, where the lid 6 is closed over the base 4 and the flange 30 of the lid 6 is slidably coupled over the base unit 4. Referring to FIG. 6B, the electrical device cover 2 may be opened by extending the lid 6 away from the base unit 4 through an external force against the bias of a spring (if used) coupled to the pin 16. FIG. 6B, therefore, illustrates a particular implementation of an electrical device cover 2 in an extended position. In the extended position, the flange 30 of the lid 6 is raised above the base unit 4 sufficiently to permit the flange 30 to clear the base unit 4 and allow the lid 6 to rotate freely.

FIG. 6C illustrates the electrical device cover 2 in an open position, where the lid 6 has been rotated in a plane substantially parallel with the base unit 4 until the interior of the base unit 4 has been exposed. The rotation of the lid 6 may be enabled by the key face 26, angled or flat, which may be used to hold the lid 6 away from the base unit 4 at a sufficient distance to allow the flange 30 to clear the base unit 4. In the open position, the electrical device 8 may be exposed. Because the lid 6 can be rotated in a plane substantially parallel with the base unit 4 to expose the electrical device 8 inside the electrical device cover 2, the ease of installation of an electrical device cover 2 may be improved as an installer can now more easily see inside the electrical device cover 2 to tighten the box mounting screws inserted into the box mounting screw apertures 14 to secure the electrical device cover 2 to a wall or other surface.

As illustrated in FIG. 6C, particular implementations of an electrical device cover 2 may include a cord port 32 in a surface of the lid, the base, or in both the lid and the base. The cord port 32 may be open, closed, or partially closed by a barrier that serves to block entry of water and other contaminants. The cord port 32 may also include a removable tab. A plurality of cord ports 32, in one or more sides of the base unit or cover, may also be included in particular implementations of an electrical device cover 2.

Referring to FIG. 7A, an additional implementation of an electrical device cover 34 is illustrated in an open position. In the open position, the lid 38 is rotatably moved to expose the electrical device aperture 52 in the base unit 36. In the open position, in particular implementations, the lid 38 may also expose the flange 58 extending outward along the perimeter 56 of the electrical device aperture 52. FIG. 7B illustrates an implementation of the electrical device cover in a closed position. As illustrated, in the closed position, the lid 38 covers the flange 58 extending outwardly along the perimeter 56 of the electrical device aperture 52 and also covers the electrical device aperture 52 itself. When the lid 38 is moved from the open to the closed position, particular implementations of electrical device covers 34 may require that an outward force be applied to the lid 38 to overcome a portion of the bias force from the spring coupling the lid 38 to the base unit 36. In particular implementations, the lid 38 may be configured to close over the base unit 36 under gravity force only when the electrical device cover 34 is mounted in a vertical or horizontal orientation with respect to a wall, floor, or other reference surface.

Implementations of an electrical device cover 2 and implementing components (lids 6, base units 4, etc.) may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, the lid and base unit may be formed of a plastic material like a polyvinyl chloride (PVC). In particular implementations, particularly implementations like those illustrated in FIGS. 7A-9, metal may be used for the base unit and/or the lid. Relevant teachings regarding the structure, manufacture, and use of metal in such implementations may be found in U.S. Pat. No. 7,176,379 to Shotey et al., entitled "Universal Cover Plate", issued Feb. 13, 2007, the disclosure of which is hereby incorporated entirely herein by reference.

Some components defining any electrical box implementation may be manufactured simultaneously and integrally joined with one another, while other components may be purchased pre-manufactured or manufactured separately and then assembled with the integral components. The various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the lid and base may be formed separately by an injection molding process, then coupled together by a separate assembly step.

It will be understood that implementations are not limited to the specific components disclosed herein, as virtually any components consistent with the intended operation of a method and/or system implementation for an electrical device cover may be utilized. Accordingly, for example, although particular lids, base units, pins, and springs may be disclosed, such components may comprise any shape, size, style, type, model, version, class, grade, measurement, concentration, material, weight, quantity, and/or the like consistent with the intended operation of a method and/or system implementation for a electrical device cover may be used.

In places where the description above refers to particular implementations of an electrical device cover, it should be readily apparent that a number of modifications may be made without departing from the spirit thereof and that these implementations may be applied to other electrical device covers.

The invention claimed is:

1. A weatherproof electrical device cover comprising:
a base unit comprising a face, an electrical device aperture, a box mounting screw aperture therethrough, a perimeter, and a flange extending outwardly along at least a portion of the perimeter; and
a lid rotatably coupled to the base unit at a position parallel with and offset from the face;
wherein the lid rotates over the base unit in a plane substantially parallel with the base unit;
wherein the lid covers the electrical device aperture of the base unit when the lid is closed over the base unit; and
wherein the flange is located within the lid when the lid is closed over the base unit.

2. The weatherproof electrical device cover of claim 1, wherein the lid further comprises a pin and the lid is coupled to the base unit at a pin opening in the base unit.

3. The weatherproof electrical device cover of claim 2, wherein the pin is coupled within the pin opening to the base unit through a spring.

4. The weatherproof electrical device cover of claim 1, wherein the perimeter of the base unit is located at one of the electrical device aperture and an edge of the face of the base unit.

5. The weatherproof electrical device cover of claim 1, wherein the base unit and the lid are rotatably coupled at a corner of the base unit.

6. The weatherproof electrical device cover of claim 1, wherein the lid of the base unit is configured to close over the base unit under gravity force when the cover is mounted to a wall in either a vertical or a horizontal orientation.

7. The weatherproof electrical device cover of claim 1, wherein the base unit is configured to accommodate a first electrical device type and the base unit further comprises at least one removable tab, wherein removal of the at least one removable tab converts the electrical device aperture in the base unit to accommodate at least a second electrical device type different from the first electrical device type.

8. The weatherproof electrical device cover of claim 1, wherein the base unit is configured to accommodate a first electrical device type and the base unit further comprises at least one adapter plate, wherein the adapter plate converts the electrical device aperture in the base unit to accommodate at least a second electrical device type different from the first electrical device type.

9. The weatherproof electrical device cover of claim 8, wherein the adapter plate further comprises at least one removable tab, wherein removal of the at least one removable tab converts the electrical device aperture in the base unit configured to accommodate a first electrical device type to accommodate at least a second electrical device type different from the first electrical device type.

10. An electrical device cover comprising:
a base unit comprising a face having an electrical device aperture, and a box mounting screw aperture therethrough; and
a lid formed as a single unitary piece;
wherein the base unit and lid are coupled at a corner of the base unit through a pin at a pin opening positioned outside of the face; and
wherein the lid rotates over the base unit in a plane substantially parallel with the base.

11. The electrical device cover of claim 10, wherein the pin is coupled within the pin opening to the base unit through a spring.

12. The electrical device cover of claim 10, wherein the lid comprises the pin and the base unit comprises the pin opening or wherein the base unit comprises the pin and the lid comprises the pin opening.

13. The electrical device cover of claim 10, wherein the lid of the base unit is configured to close over the base unit under gravity force when the cover is mounted to a wall in either a vertical or a horizontal orientation.

14. The electrical device cover of claim 10, wherein the base unit is configured to accommodate a first electrical device type and the base unit further comprises at least one removable tab, wherein removal of the at least one removable tab converts the electrical device aperture in the base unit to accommodate at least a second electrical device type different from the first electrical device type.

15. The electrical device cover of claim 10, wherein the base unit is configured to accommodate a first electrical device type and the base unit further comprises at least one adapter plate, wherein the adapter plate coverts the electrical device aperture in the base unit to accommodate at least a second electrical device type different from the first electrical device type.

16. The electrical device cover of claim 15, wherein the adapter plate further comprises at least one removable tab, wherein removal of the at least one removable tab converts the electrical device aperture in the base unit configured to accommodate a first electrical device type to accommodate at least a second electrical device type different from the first electrical device type.

17. An electrical device cover comprising:
a base unit comprising a face having an electrical device aperture, and a box mounting screw aperture therethrough, and
a lid;
wherein the base unit and the lid are rotatably coupled at a position outside of the face through a spring; and
wherein the lid rotates over the base unit in a plane substantially parallel with the base unit.

18. The electrical device cover of claim 17, wherein the base unit and the lid are rotatably coupled at a corner of the base unit.

19. The electrical device cover of claim 17, wherein the lid of the base unit is configured to close over the base unit under gravity force when the cover is mounted to a wall in either a vertical or a horizontal orientation.

20. The electrical device cover of claim 17, wherein the base unit is configured to accommodate a first electrical device type and the base unit further comprises at least one removable tab, wherein removal of the at least one removable tab converts the electrical device aperture in the base unit to accommodate at least a second electrical device type different from the first electrical device type.

21. The electrical device cover of claim 17, wherein the base unit is configured to accommodate a first electrical device type and the base unit further comprises at least one adapter plate, wherein the adapter plate converts the electrical device aperture in the base unit to accommodate at least a second electrical device type different from the first electrical device type.

22. The electrical device cover of claim 21, wherein the adapter plate further comprises at least one removable tab, wherein removal of the at least one removable tab converts the electrical device aperture in the base unit configured to accommodate a first electrical device type to accommodate at least a second electrical device type different from the first electrical device type.

* * * * *